United States Patent [19]

O'Toole

[11] Patent Number: 5,610,345
[45] Date of Patent: Mar. 11, 1997

[54] DEVICE FOR DETERMINING THE RADIAL DISPLACEMENT OF A MOTOR VEHICLE RELATIVE TO THE OVERALL DIRECTION-OF-TRACK OF SAME

[76] Inventor: Marcus L. O'Toole, 7614 E. Fourth St., Scottsdale, Ariz. 85251

[21] Appl. No.: 583,427

[22] Filed: Jan. 5, 1996

[51] Int. Cl.⁶ ........................................ G01N 19/02
[52] U.S. Cl. .............................. 73/865.8; 33/600
[58] Field of Search ................. 73/9, 865.8; 33/1 N, 33/1 PT, 1 AP, 534, 538, 600, 608; 180/197, 282; 280/757

[56] References Cited

U.S. PATENT DOCUMENTS

| | | |
|---|---|---|
| 3,719,246 | 3/1973 | Bott . |
| 4,315,426 | 2/1982 | Brandon . |
| 4,909,073 | 3/1990 | Takashashi et al. . |
| 5,247,466 | 9/1993 | Shimada et al. . |
| 5,351,192 | 9/1994 | Tsuyama et al. . |

Primary Examiner—Robert Raevis

[57] ABSTRACT

A device for determining the radial displacement of a motor vehicle relative to the overall direction-of-track of same, said device comprising a swing arm; a tire/wheel assembly which is operatively disposed upon one end of said swing arm and is provided to facilitate tractive rolling engagement of said swing arm with a road surface; a spring-loaded pivot assembly secured to substantially the end of said swing arm opposite of said tire/wheel assembly; and a rotatably free kingpin which is secured to said swing arm through said spring-loaded pivot in such manner as to provide a radial reference for said spring-loaded pivot to facilitate the forcing of said tire/wheel assembly onto said road surface for the purpose of tractively following any perturbations existant thereon. Said kingpin defines a rotational axis which extends essentially normally from said road surface, the relationship of the rotational axis of said kingpin to the rolling axis of said tire/wheel assembly creates a caster effect which allows said swing arm to track with the vector that said motor vehicle is travelling in. A suitable housing, which is also provided, rotatably secures said kingpin and secures and references a potentiometer therewithin and to the underportion of said motor vehicle. Said potentiometer is mechanically synchronized to the radial displacements of said rotatably free kingpin within said housing for the purpose of translating said displacements, and hence, the changing radial relationship of said vehicle to the vector in which the motor vehicle is travelling, into an electrical resistive value.

8 Claims, 12 Drawing Sheets

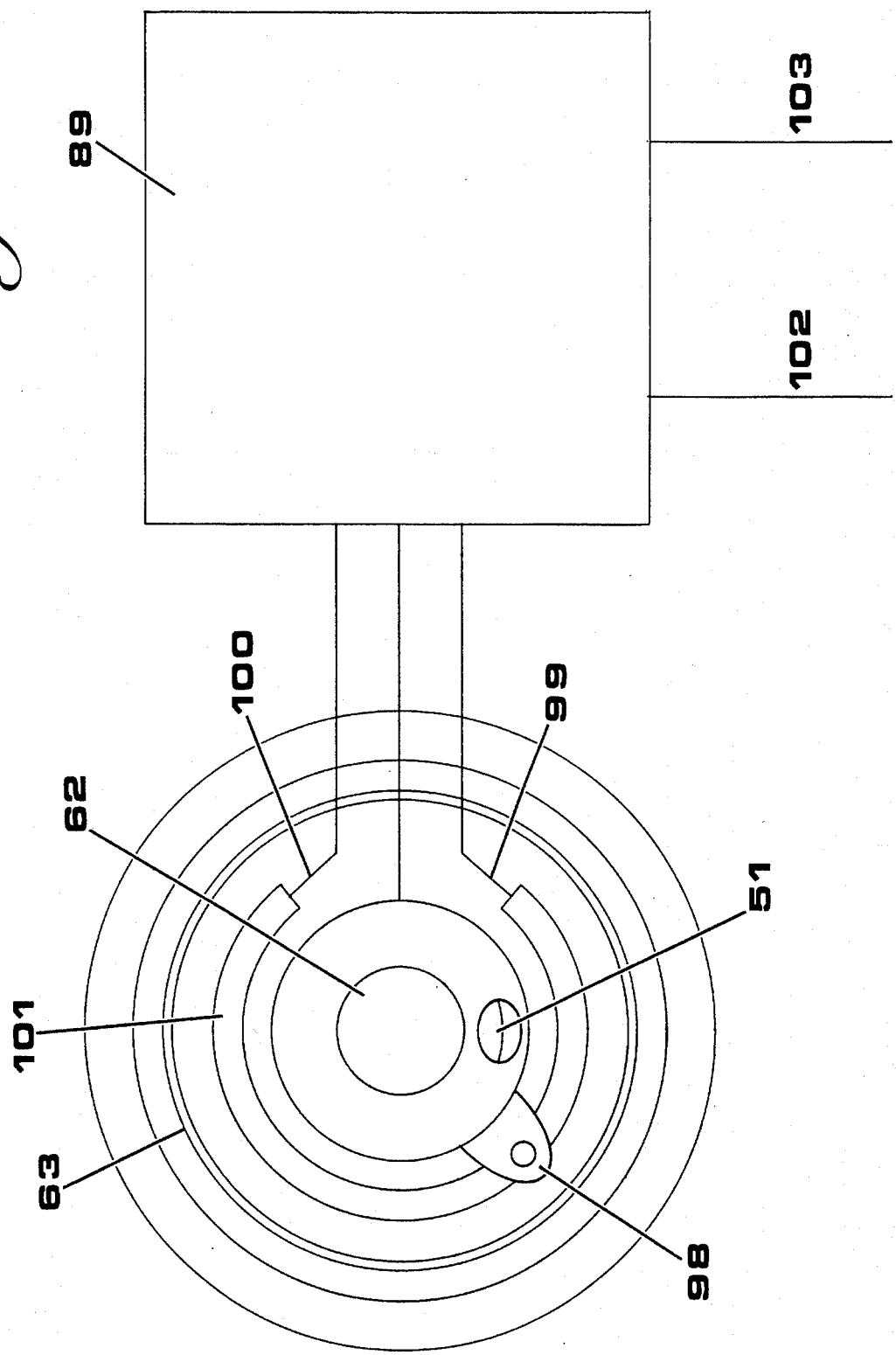

DEVICE FOR DETERMINING THE RADIAL DISPLACEMENT OF A MOTOR VEHICLE RELATIVE TO THE OVERALL DIRECTION-OF-TRACK OF SAME

BACKGROUND OF THE INVENTION

The present invention relates to devices and processes which are utilized to detect or limit positional errors with respect to the intended direction-of-track of a motor vehicle during maneuvering upon a road surface.

A number of apparatuses have been disclosed in prior art seeking to achieve the aforestated objective. For example, U.S. Pat. No. 3,719,246 BOTT discloses a machine which is comprised of a gyroscope, an array of sensors and actuators and a control circuit. The sensors and gyroscope are disposed about the structure of a motor vehicle in a manner which facilitates the gathering of data concerning the pitch, roll and yaw axes as well as the transverse velocity of the vehicle's tires and the steered direction of the front wheels. Forward velocity is also measured, along with the attendant position of the throttle plate. These parameters are introduced into the disclosed control circuit which selectively modulates throttle and braking responses to the vehicle's several wheels in response to an inferred sliding condition of the automobile, as dictated by one of three programs which is manually selected by the operator of the motor vehicle. In a similar manner, U.S. Pat. No. 5,247,466 SHIMADA et. al. discloses in his teaching a device which comprises G-sensors disposed about the structure of an automobile for the purpose of providing a transductive matrix from which an on-board computer may infer the tractive state of the subject vehicle and adjust the velocity of the automobile as necessary to avoid a sliding condition of same. U.S. Pat. No. 5,351,192 TSUYAMA et. al. also teaches in his disclosure an inference-type apparatus which utilizes a measuring system to quantify the lateral and rectilinear accelerations of a motor vehicle from the rotational differential of the vehicle's wheels for the purpose of estimating the associated road surface's resistance. With his arrangement, a sliding condition of the motor vehicle can be discerned by an on-board computer system based upon the factors of estimated road surface resistance and the vehicle's instant operational mode.

All of the aforementioned systems are not true positional detection devices and therefore must infer from the data gathered from a number of associated input devices when a motor vehicle has lost, or is about to lose, directional fidelity. As such, these machines must make fairly broad assumptions concerning the tractive state of the subject motor vehicle. These assumptions can lead to operational errors which, at the least, will narrow the envelope of the vehicle's handling potential, and quite possibly could lead to hazardous operational modes. Also, by their nature, the aforestated type of devices are very complex in terms of hardware and software and pose considerable practical difficulties in terms of adaptability of any one completed structure to another similar-type vehicle.

SUMMARY OF THE INVENTION

The present invention addresses the aforementioned limitations through the utilization of the well-known caster effect which, when implemented in accord with the specification hereafter to be developed in detail, yields a device which provides an electrical resistive value that is proportional to the instant true radial position of a motor vehicle relative to its overall direction-of-track. Structural simplicity, high reliability and ease of design portability amongst many vehicular structural variations are key features of the present invention.

The present invention embraces a new and novel construct of remarkable simplicity which is secured to the underportion of a motor vehicle and comprises a fully suspended swing arm whereupon a freely-spinning tire/wheel assembly is secured at the lower end thereof for the purpose of facilitating rolling contact with a road surface therebeneath and a kingpin component which is disposed at the opposite end of said swing arm and is secured to same through an interposed spring-loaded pivot which is provided to force the aforementioned tire/wheel to maintain rolling contact with the road surface at all times. The kingpin component defines a rotational axis which runs substantially normally with respect to the road surface and is secured to the underportion of the vehicle by an associated housing within which a portion of said kingpin component is received in a rotatably free fashion about the aforementioned rotational axis of said kingpin. The relationship of the rotational axis of said kingpin to the spin axis of said tire/wheel assembly creates a caster effect which allows the completed structure to follow with the vector of the motor vehicle by rotating about the kingpin's rotational axis. A potentiometer, which is also included in this device, serves to translate the rotational movement of the aforementioned kingpin into an electrical resistive value. This proportional electrical quantity can then be utilized by on-board equipment for the purpose of controlling the magnitude of the vehicle's forward velocity in response to a sliding condition of same, or may simply be developed into a displayable quantity upon a suitable readout.

These and further objects and advantages will become readily apparent to the reader as one embodiment of the present invention is revealed and elucidated by the following detailed specification and drawing figures.

DRAWINGS

Figure 7:
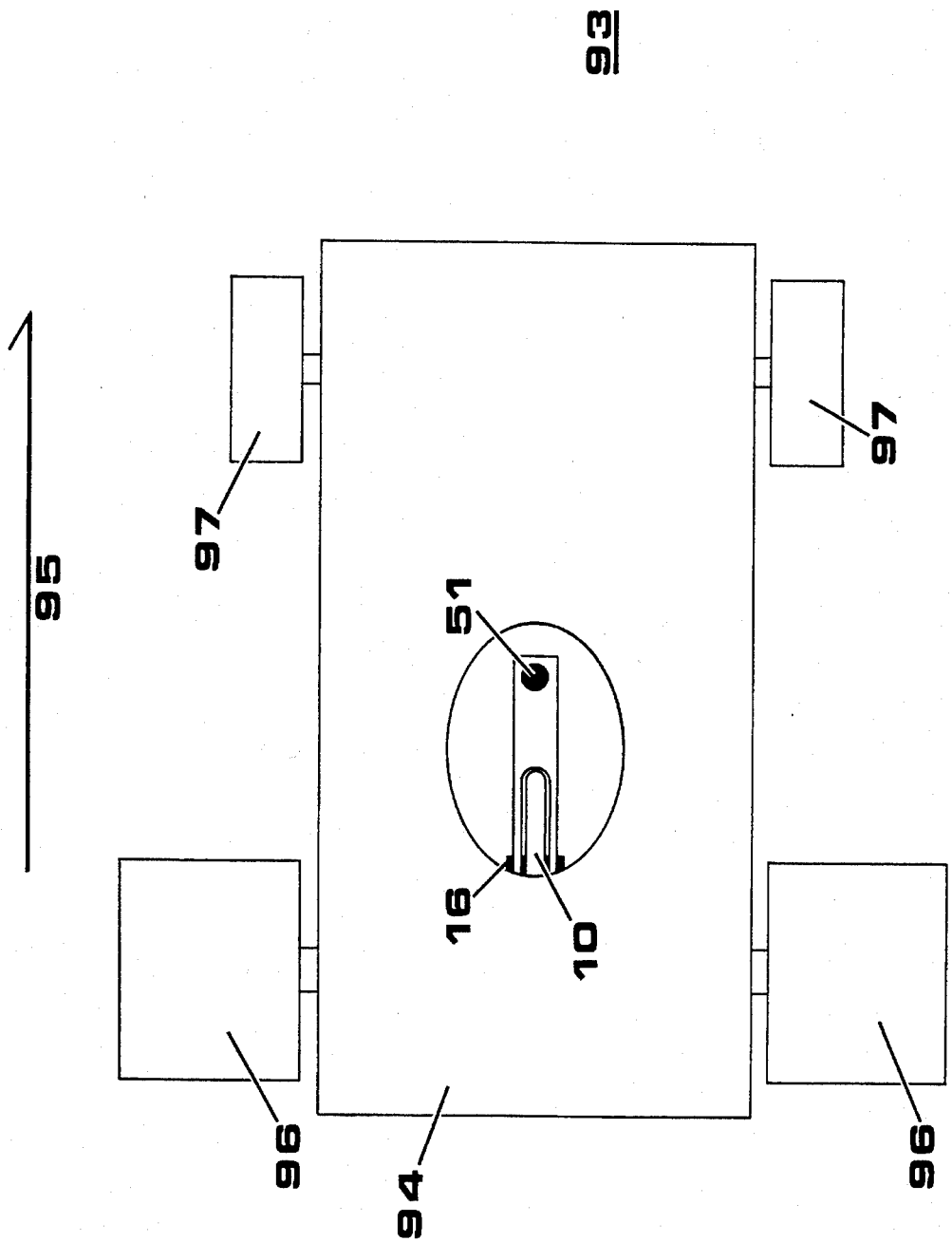
Figure 8:
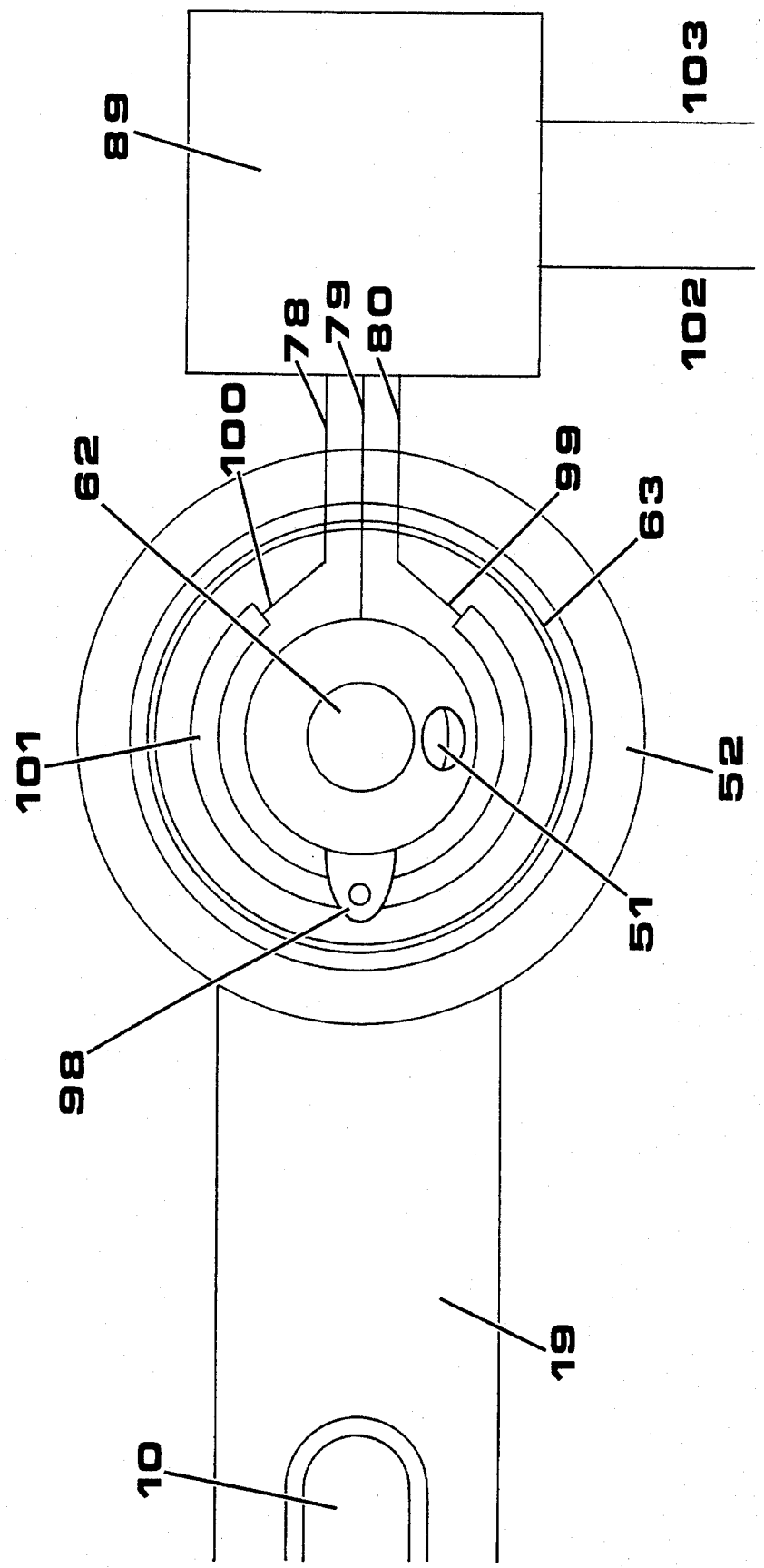
Figure 9:
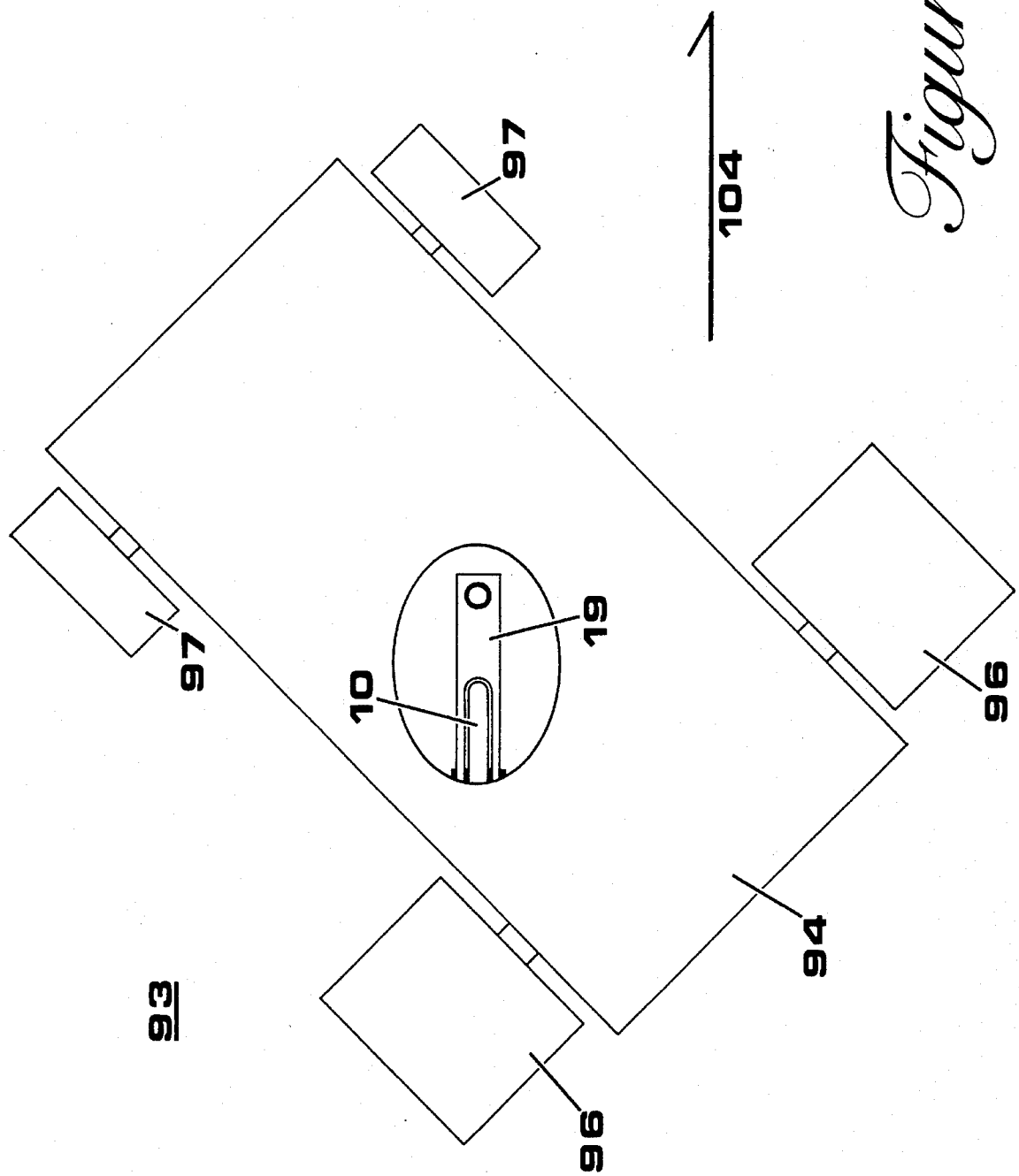
Figure 10:
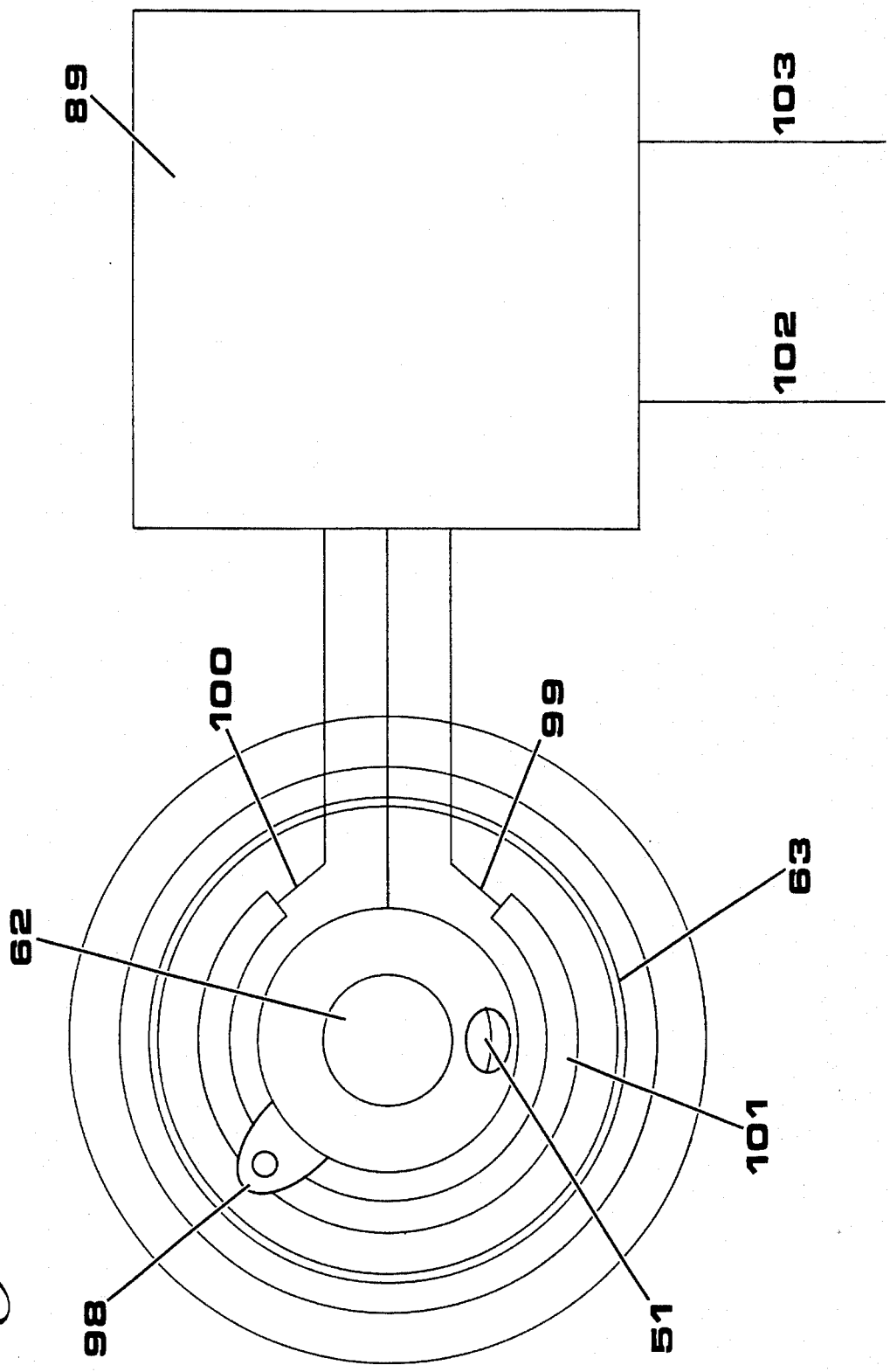
Figure 11:
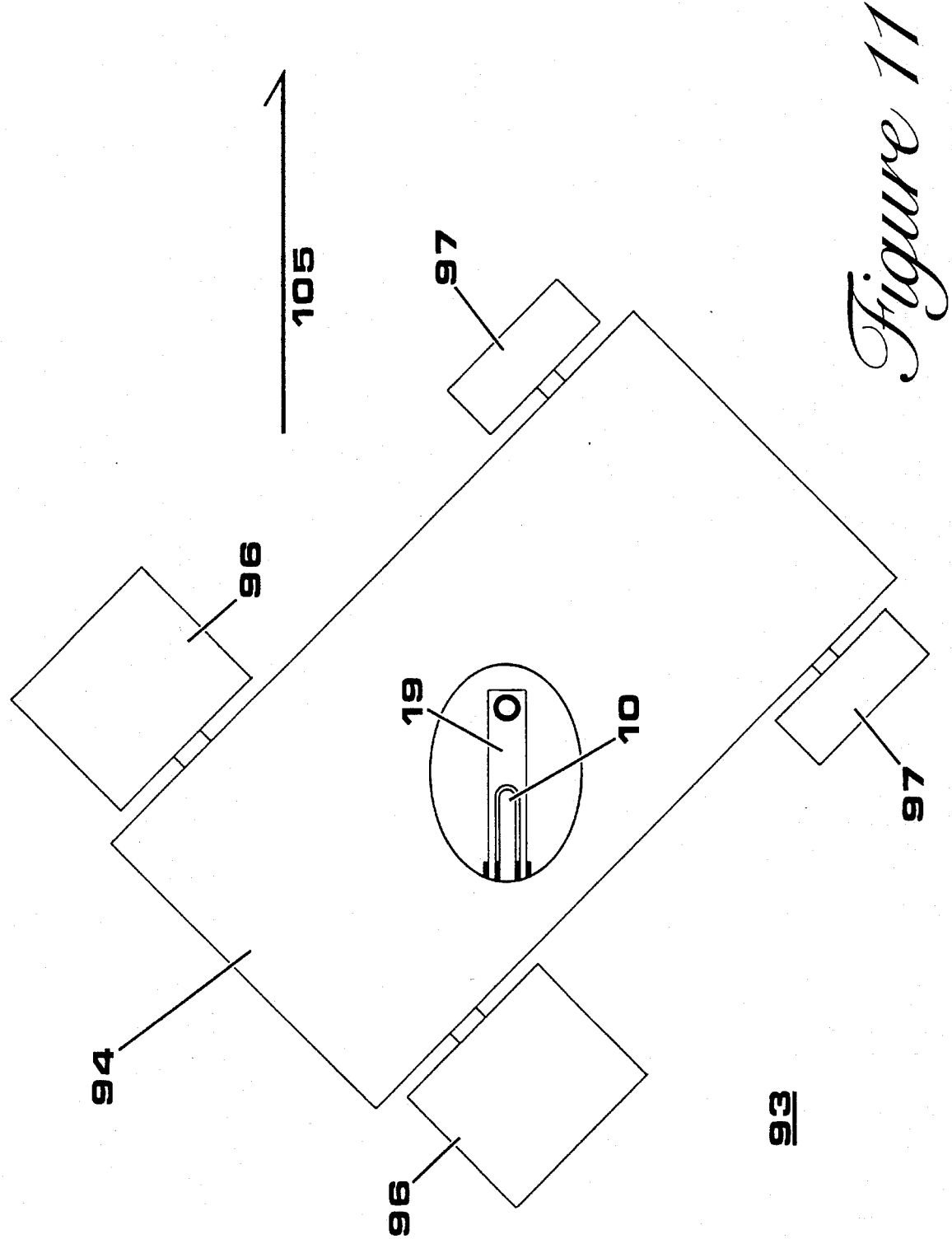

FIGS. 7, 9 and 11 are mechanical schematics shown partially in section and from an overhead perspective depicting a moving vehicle operating in various tractive modes and showing the mechanical responses thereto of the swingarm portion of a device which is one embodiment of the present invention: and FIGS. 8, 10 and 12 are electromechanical schematics shown partially in section and from an overhead perspective depicting the changing electromechanical status of the transductive portion of a device which is one embodiment of the present invention; said changing electromechanical status synchronized to the aforementioned mechanical responses of said swingarm portion which are shown in FIGS. 7, 9 and 11, respectively.

DESCRIPTION OF THE PREFERRED EMBODIMENT

Figure 1:
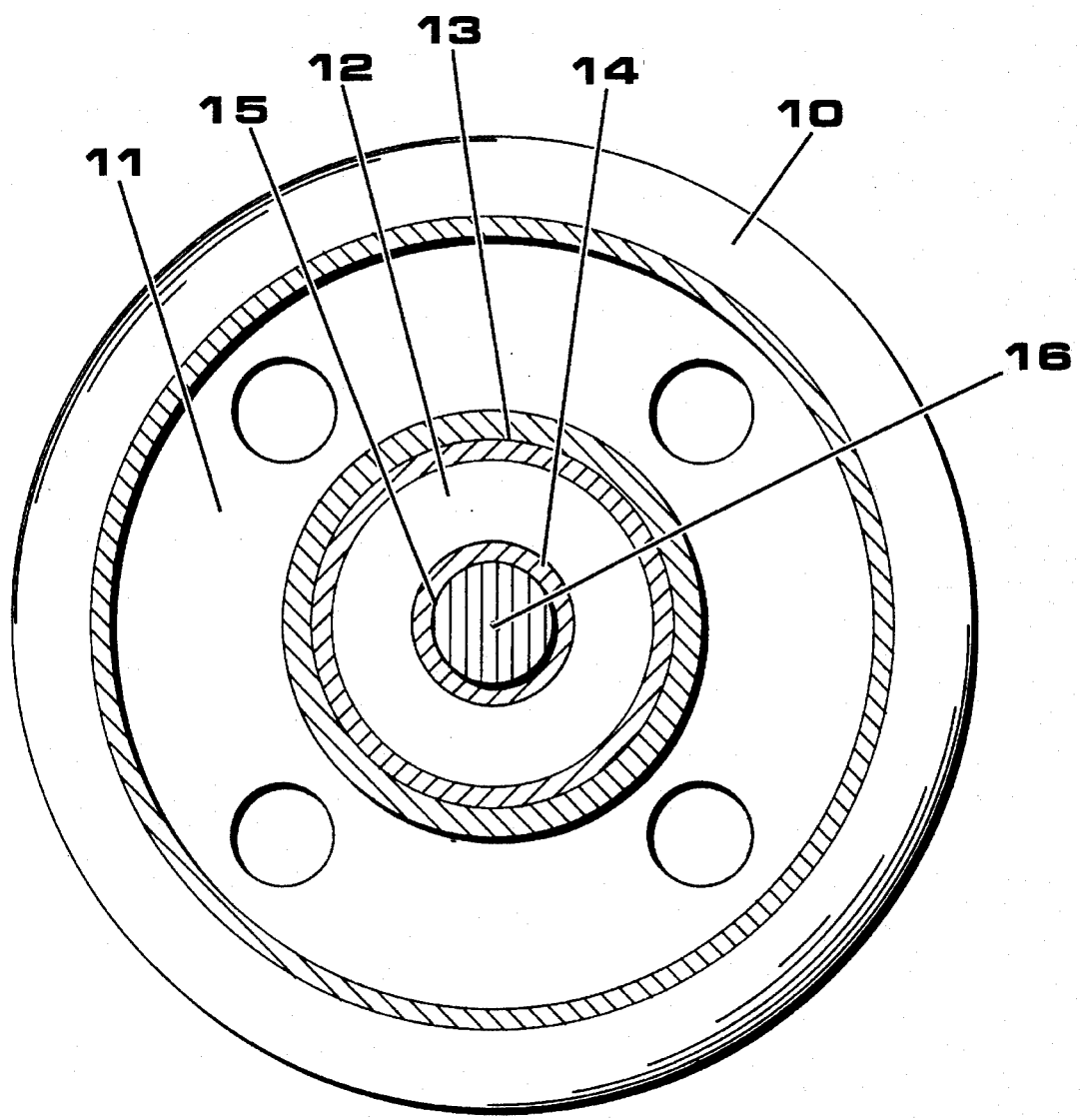
FIG. 1 is a side elevation depicting a tire/wheel assembly and a sectioned axle of a device which is one embodiment of the present invention.

Referring now to FIG. 1, tire 10 is concentrically disposed upon hub 11 by means of a suitable press-fit. Hub 11 retains wheel bearing 12 by means of an interference-fit within inner annulus of said hub 11 at interface 13. Inner race, 14, of wheel bearing 12 circumscribes journal 15 of axle 16 in a radially close-fitting relationship thereto. Moving now to FIG. 2, axle 16 comprises a hexagonal head portion 17 and a threaded portion 18, provided upon the respective proximal and distal ends thereof, for the purpose of providing suitable axial securing facility to swing arm 19, as will be described hereunder. The lower portion of swing arm 19 securably retains axle 16 from radial escapement by means of the radially close-fitting relationship of parallel bores 20 and 21, provided within fork segments 22 and 23 of swing arm 19, to the journal surface 15 of axle 16 which is alignedly installed through said fork segments' parallel bores 20 and 21. Alignedly installed axle 16 is prohibited from axial escapement from parallel bores 20 and 21 by means of nut 24 which is threaded onto threaded portion 18 of axle 16 and tightened to the extent necessary to facilitate a snug, axially-abutting relationship of the respective inner and outer radiuses of hexagonal head portion 17 of axle 16, fork segment 23 of swing arm 19, inner race 14 of wheel bearing 12, fork segment 22 of swing arm 19 and nut 24 to each other.

Figure 2:
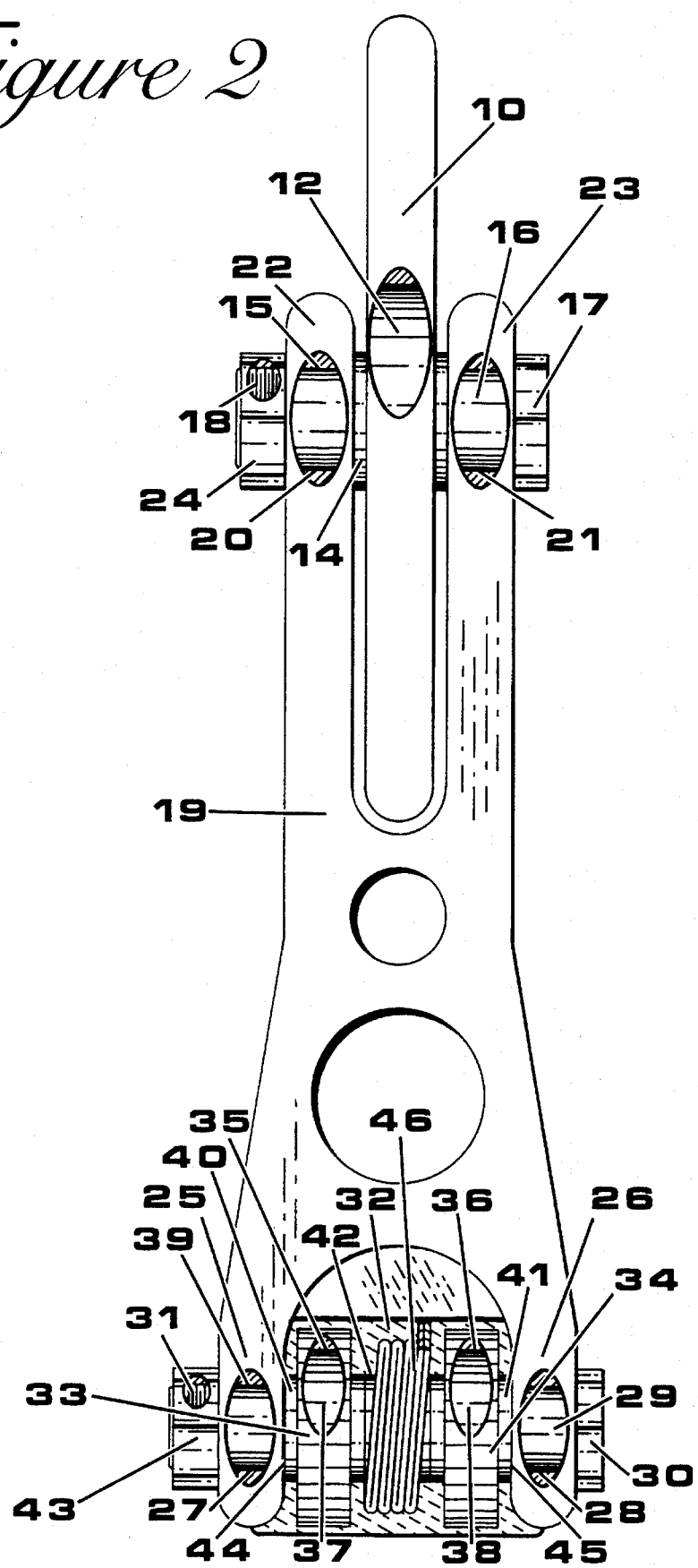
FIG. 2 is a bottom view showing mechanical details of the swingarm portion of a device which is one embodiment of the present invention.

Continuing to refer to FIG. 2, the upper portion of swing arm 19 is provided with fork segments 25 and 26 and parallel bores 27 and 28 for reception of pivot shaft 29. Pivot shaft 29 comprises a hexagonal head portion 30 and a threaded portion 31 provided upon the respective proximal and distal ends thereof for the purpose of providing suitable securing facility for swing arm 19 to spindle head 32. Spindle head 32 is provided with fork segments 33 and 34 through which transverse bores 35 and 36 are drilled for press-fit reception of roller bearings 37 and 38 therewithin. The journal surface, 39, of pivot shaft 29 is uniformly dimensioned to a diameter which is radially interferent with parallel bores 27 and 28 of swing arm 19, whilst allowing a light sliding fit within the inner races 40 and 41 of roller bearings 37 and 38 of spindle head 32 and the inner annulus of stress bushing 42. Stress bushing 42 is dimensioned to fit snugly between the inner races 40 and 41 of installed roller bearings 37 and 38 to provide for correct axial separation of said inner races 40 and 41. Pivot shaft 29 is fitted through the aligned bores 27 and 28 of fork segments 25 and 26 of swing arm 19, the inner annulus of stress bushing 42 and the inner races 40 and 41 of roller bearings 37 and 38 of spindle head 32 to the extent required to bring the inner radius of hexagonal head portion 30 of pivot shaft 29 snugly against the outer surface of fork segment 26 of swing arm 19. Nut 43 is threaded onto threaded portion 31 of pivot shaft 29 and is snugly tightened to the extent necessary to take up any axial clearance existing between the axially-abutting interfaces of the inner radius of fork segment 25 of swing arm 19 with the outer radius of inner race 40 of roller bearing 37 at interface 44, and the inner radius of fork segment 26 of swing arm 19 with the outer radius of inner race 41 of roller bearing 38 at interface 45.

Continuing to refer to FIG. 2, torsion wire spring 46 is circumscriptively disposed about stress bushing 42, in a non-contacting relationship thereto, between fork segments 33 and 34 of spindle head 32. Arm, 47, of torsion wire spring 46, is securably engaged to spindle head 32 through means of insertion into suitably sized drilling 48, as is detailed in FIG. 3. In like manner, arm 49 of torsion wire spring 46 is securably engaged to swing arm 19 through means of insertion into suitably sized drilling 50. Installation of torsion wire spring 46 in the aforedescribed manner is set forth to serve the purpose of "spring-loading" swing arm 19, and the componentry operatively disposed thereon, against spindle head 32 to provide arcuate displacement of said swing arm about the rotational axis defined by pivot shaft 29 for a purpose to hereafter be described.

Figure 3:
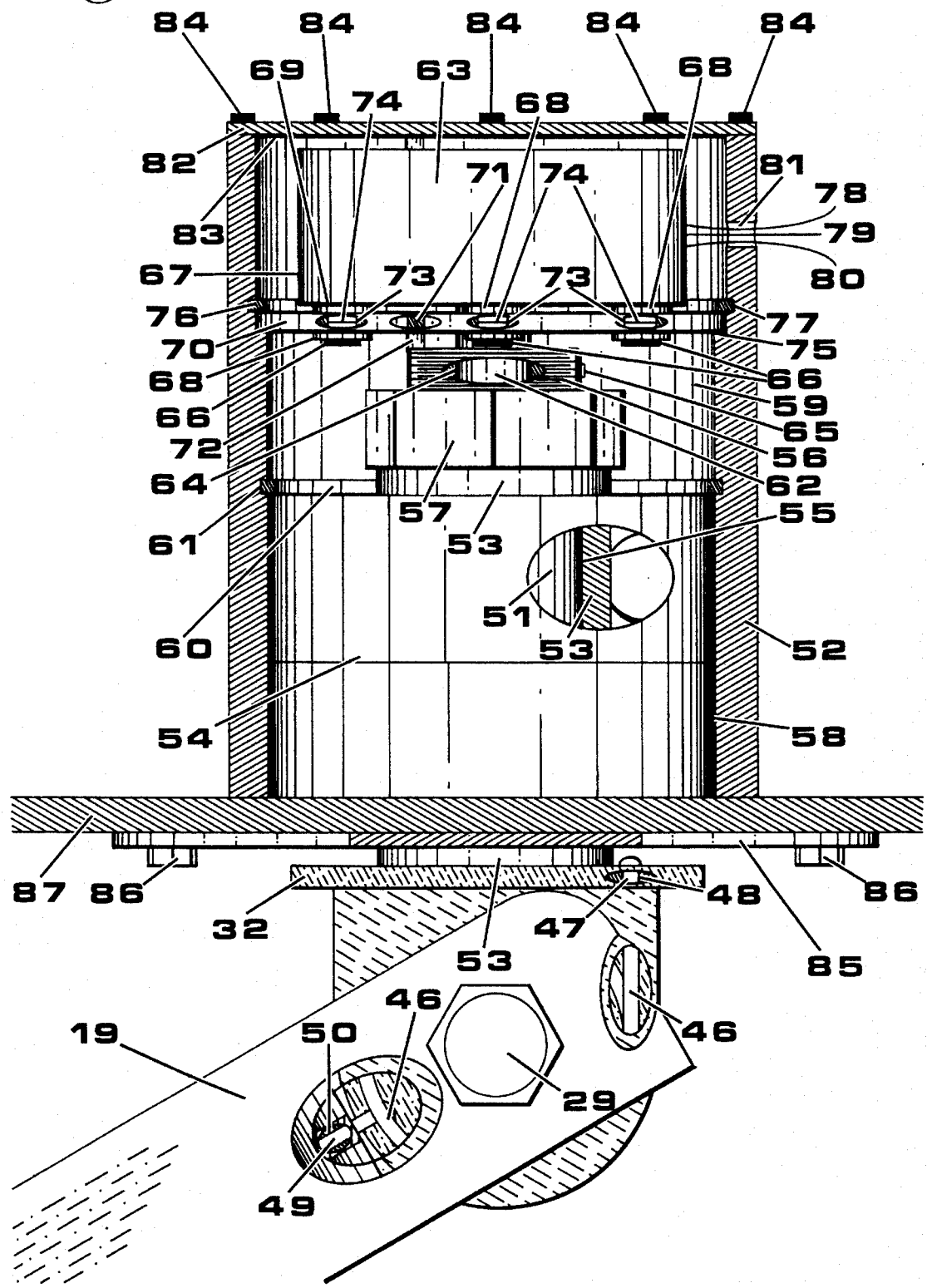
FIG. 3 is a partially sectioned side elevation showing mechanical details, less the inner raceway grooving of duplex ball bearing assemblage 54, of the transductive portion of a device which is one embodiment of the present invention.

Continuing to refer to FIG. 3, kingpin section 51 is integrally formed with spindle head 32 and extends upwardly, in an essentially normal angular relationship to the rotational axis of pivot shaft 29, into instrument housing 52. Inner race 53 of duplex ball bearing assemblage 54 is press-fitted over the journal surface 55 of kingpin section 51 to the extent required to bring inner race 53 into surface-to-surface abutment with the uppermost portion of spindle head 32. Threaded portion 56 is provided upon the distal end of kingpin section 51 to allow threading of fastener nut 57 thereon. Fastener nut 57 is tightened to the extent necessary to prohibit any possible axial movement of said inner race 53 of duplex ball bearing assemblage 54 upon kingpin section 51. Outer race 58 of duplex ball bearing assemblage 54 is restrained from radial displacement within bore 59 of instrument housing 52 by means of a suitable radially interferent fit within said bore 59. Outer race 58 of duplex ball bearing assemblage 54 is restrained from axial movement within bore 59 of instrument housing 52 by means of a circlip retaining ring 60 set within annular groove 61 which is milled into the approximate mid-portion of bore 59 of instrument housing 52.

Continuing to refer to FIG. 3, potentiometer shaft, 62, of potentiometer 63 is dimensioned to fit snugly within bore 64 which is concentrically drilled into the distal end of kingpin section 51. Potentiometer shaft 62 is installed into said bore 64 add secured therein by means of surface engagement with setscrew 65. Mounting screws, 66, for potentiometer 63 secure elastomeric grommets 68 to potentiometer body 67 at face 69. Potentiometer mounting plate 70 is snugly fitted within instrument housing 52, and is restrained from radial movement therein by means of securative engagement of tongue portion 71, which is integrally formed with said potentiometer mounting plate 70, with axially-extending groove 72 which is milled into the inner annulus of instrument housing 52. Holes, 73, provided through potentiometer mounting plate 70, are placed substantially in registry with grommets 68 which are secured to potentiometer body 67 at face 69 by means of mounting screws 66. Holes 73 are dimensioned to snugly engage elastomeric grommets 68 at grommet grooves 74. Potentiometer mounting plate 70 is snugly held against concentric shoulder 75, provided in the body of instrument housing 52, by means of circlip retaining ring 76; said circlip retaining ring 76 being radially expanded into concentric groove 77 which is milled into the body of instrument housing 52. The aforedescribed potentiometer mounting scheme is provided to protect the internal mechanical structures of potentiometer 63 from damage due to minor misalignments occurring within the geometrical relationship of interconnected shafting members 62 and 51 with instrument housing 52. Potentiometer leadwires 78, 79 and 80 are passed through hole 81 which is bored through the side of instrument housing 52. Cover plate 82 is secured to the open end 83 of instrument housing 52 by means of screws 84.

Figure 4:
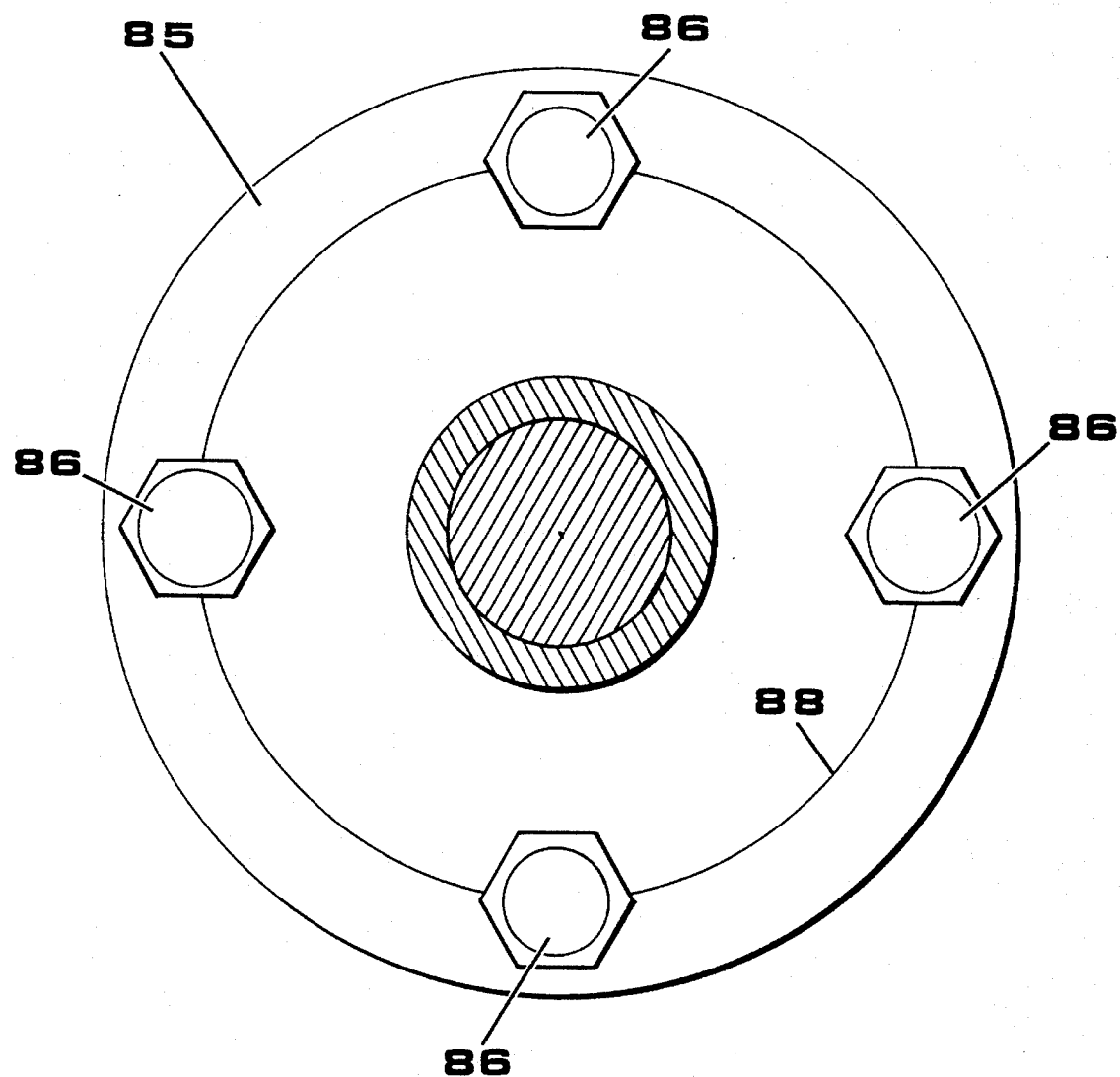
FIG. 4 is a partially sectioned bottom view showing mechanical details of the mounting flange portion of a device which is one embodiment of the present invention.

Continuing to refer to FIG. 3, integrally formed mounting flange 85 of instrument housing 52 is secured to the vehicle underportion 87 by means of mounting screws 86 which are disposed in a substantially equidistant relationship to each other about mounting circle 88, as is further detailed in FIG. 4.

Figure 5:
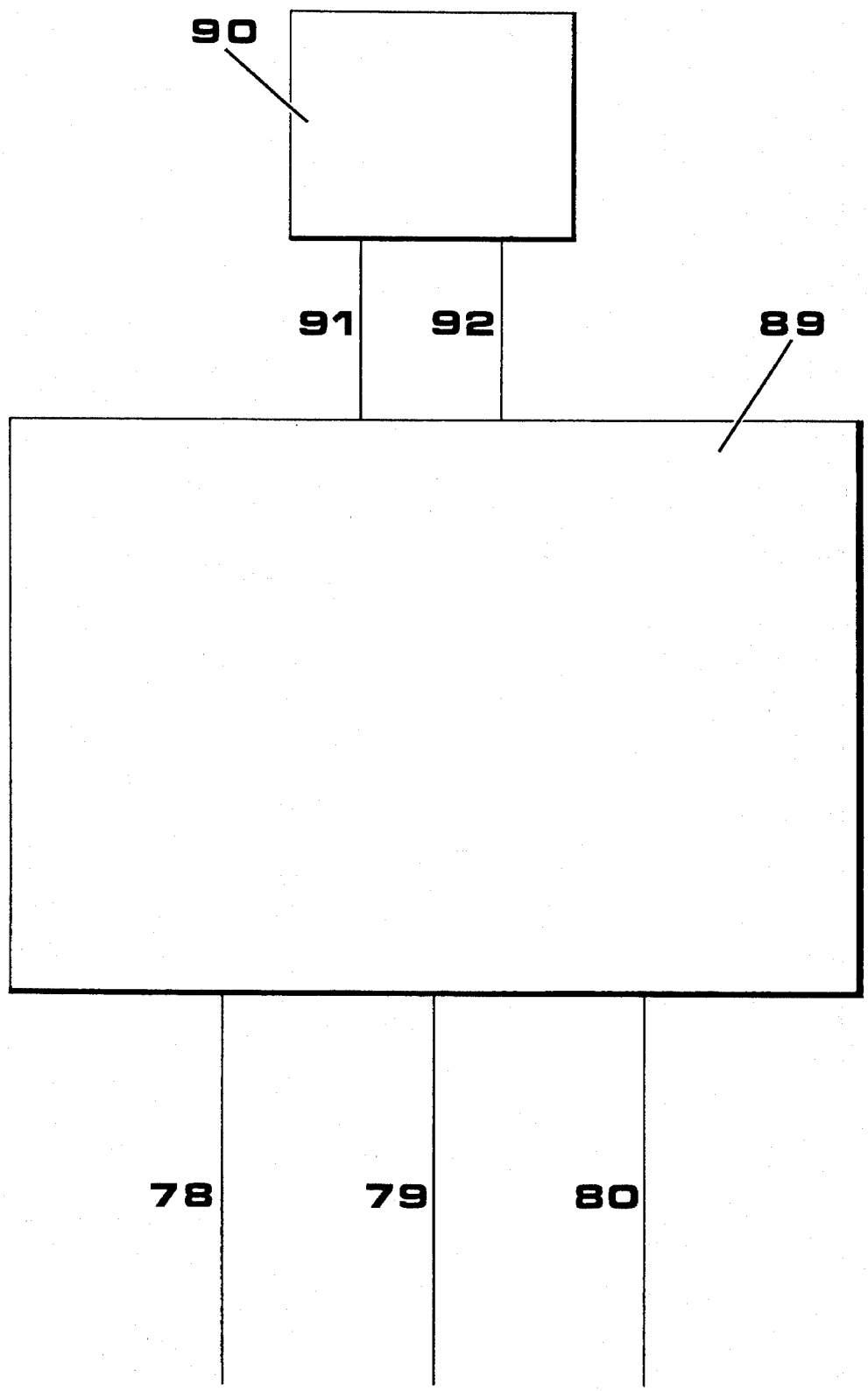
FIG. 5 is an electrical block diagram depicting a power source and a circuit for a device which is one embodiment of the present invention.

Referring now to FIG. 5, potentiometer leadwires 78, 79 and 80 are electrically connected to circuit 89 for a purpose to hereafter be described. Power source 90 is electrically connected to circuit 89 via wires 91 and 92 for the purpose of supplying suitable operating current to circuit 89.

Figure 6:
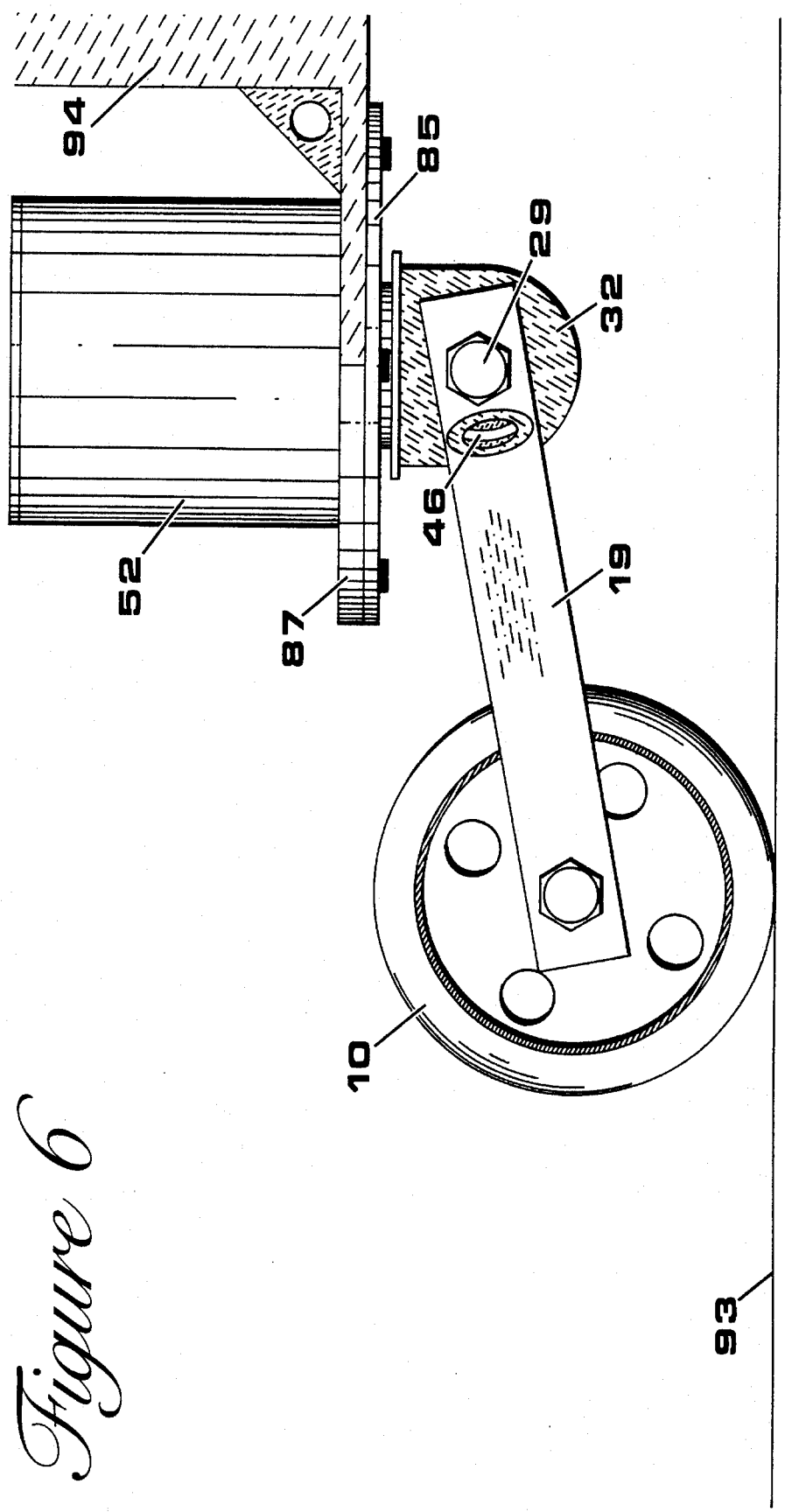
FIG. 6 is a partially sectioned side elevation showing the road-interfacive external mechanical interrelationships of a device which is one embodiment of the present invention.

Referring now to FIG. 6, tire 10 which is appended to swing arm 19 is pressed against tractive road surface 93 by means of the aforedescribed "spring-loading" effect of torsion wire spring 46 which is acting to arcuately displace swing arm 19 about the axis defined by pivot shaft 29 relative to spindle head 32. Spindle head 32 is secured in the aforedescribed fashion via mounting flange 85 of instrument housing 52 to vehicle under-portion 87 of vehicle 94.

Moving now to FIG. 7, vehicle 94 is shown moving in a straight line, along road surface 93, in a diagrammatically left-to-right direction as indicated by vector 95. Driving wheels 96 and steering wheels 97 are defining paths which are parallel to vector 95 as is tire 10 owing to the caster effect caused by the aforedefined geometrical relationship of axle 16 with kingpin section 51. Potentiometer shaft 62, as is shown in FIG. 8, is radially aligned with kingpin section 51 so as to allow center tap 98 of potentiometer 63 to be adjusted to the approximate mid-point between pole taps 99 and 100 of arcuate resistive element 101 of potentiometer 63 when tire 10 and swing arm 19 are aligned with vehicle 94 in a straight line vector.

Continuing to refer to FIG. 8, circuit 89, connected to potentiometer taps 98, 99 and 100 via potentiometer leadwires 78, 79 and 80, receives the relative resistive values existant between center tap 98 and pole taps 99 and 100 and converts said resistive values to an electrical signal which is exported from circuit 89 via leadwires 102 and 103. In one practice of the preferred embodiment, this electrical signal may be a voltage value which is variable between 0 and 5 volts; 2.5 volts, for example, being developed over leadwires 102 and 103 when center tap 98 of potentiometer 63 is adjusted to the approximate midpoint between pole taps 99 and 100. This exported voltage value is now directly related to the radial displacement of swing arm 19, about the rotational axis of kingpin section 51, relative to instrument housing 52; and, hence, the vectorial relationship of tire 10 to the angular displacement of vehicle 94 relative to the overall direction-of-track. This voltage value may be utilized by other circuitry, disposed within the vehicle 94, to effect changes in the operational parameters of said vehicle (e.g. brake modulations or throttle attenuation) or may simply be converted to a displayable quantity upon a suitable readout.

Moving now to FIG. 8, vehicle 94 is shown sliding partially side-ways, along road surface 93, in a diagrammatically left-to-right direction as indicated by vector 104. Driving wheels 96 and steering wheels 97 are skidding in paths which are defined parallel to vector 104, whilst tire 10 has repositioned swing arm 19 relative to underportion 87 of vehicle 94, due to the aforementioned caster effect, and is proceeding to roll in the direction of vector 104. Potentiometer shaft 62, as is shown in FIG. 10, which is concentrically secured to kingpin section 51, has caused center tap 98 of potentiometer 63 to migrate in a clockwise direction towards pole tap 100 along arcuate resistive element 101. This radial repositioning of center tap 98 upon arcuate resistive element 101 has altered the balance of relative resistive values existant between center tap 98 and pole taps 99 and 100, and, therefore, has caused circuit 89 to export a new voltage value; 3.75 volts, for example, over leadwires 102 and 103. This new voltage value can now be utilized by other circuitry disposed within vehicle 94 to monitor or control said sliding condition of said vehicle 94.

Moving now to FIG. 11, vehicle 94 is shown sliding partially side-ways, along road surface 93, in a diagrammatically left-to-right direction as indicated by vector 105. Driving wheels 96 and steering wheels 97 are skidding in paths which are defined parallel to vector 105 whilst tire 10 has repositioned swing arm 19 relative to vehicle underportion 87 of vehicle 94, due to the aforementioned caster effect, and is proceeding to roll in the direction of vector 105. Potentiometer shaft 62, as is shown in FIG. 12, which is concentrically secured to kingpin section 51, has caused center tap 98 of potentiometer 63 to migrate in a counter-clockwise direction towards pole tap 99 along arcuate resistive element 101. This radial repositioning of center tap 98 upon arcuate resistive element 101 has altered the balance of relative resistive values existant between center tap 98 and pole taps 99 and 100, and, therefore, has caused circuit 89 to export a new voltage value; 1.25 volts, for example, over leadwires 102 and 103. This new voltage value can now be utilized by other circuitry disposed within vehicle 94 to monitor or control said sliding condition of said vehicle 94.

The foregoing specification and drawings have revealed one embodiment of the present invention. This invention is limited solely by the scope of the claims which are recited hereafter and not the details of the preceding specification. It is understood that many modifications and alterations may be apparent to one with ordinary skill in the art upon apprehension of this disclosure. Any such modifications and alterations are intended to be within the scope of the present invention.

I claim:

1. A device for determining the radial displacement of a motor vehicle upon a road surface relative to the overall direction-of-track of same, said device comprising:

a. a tire/wheel assembly which is rotatably affixed to one end of a swing arm, the rotational axis of said tire/wheel assembly running substantially parallel to said road surface for the purpose of allowing said tire/wheel assembly to roll freely upon said road surface;

b. a spring-loaded pivot operatively integrated to substantially the opposite end of said swing arm from said tire/wheel assembly, said spring-loaded pivot defining an axis running substantially parallel to said road surface for the purpose of providing a pivot upon which said swing arm is urged to arcuately rotate in order to facilitate contact between said tire/wheel assembly and said road surface;

c. a rotatably free kingpin operatively connected to said swing arm through said spring-loaded pivot, said rotatably free kingpin provided for the purpose of providing a rotational axis for said swing arm, said axis extending essentially in a normal angular relationship with respect to said road surface;

d. a potentiometer operatively synchronized to the rotation of said rotatably free kingpin, said potentiometer provided to convert the rotational displacements of said rotatably free kingpin into an electrical resistive value; and e. a suitable housing for rotatably securing said rotatably free kingpin therewithin and securing and mechanically referencing said potentiometer to the underportion of said motor vehicle.

2. A device according to claim 1 in which said tire/wheel assembly is rotatably affixed to said swing arm by an interposed axle.

3. A device according to claim 1 in which said spring-loaded pivot is comprised of a pivot pin which is provided to hingedly and coaxially link said swingarm to said rotatably free kingpin and a spring member which is operatively interposed between and securably engaged to said swing arm and said rotatably free kingpin for the purpose of urging said tire/wheel assembly onto said road surface.

4. A device according to claim 3 in which said rotatably free kingpin comprises a head portion, upon which said pivot pin and said spring member are securably received, and a shafting portion provided to locate said rotatably free kingpin within said suitable housing.

5. A device according to claim 3 in which said swing arm comprises an end substantially upon which said pivot pin and said spring member are securably received.

6. A device according to claim 4 in which said suitable housing comprises a bearing assembly provided to securably receive said shafting portion of said rotatably free kingpin in a free-turning relationship thereto.

7. A device according to claim 4 in which the center tap of said potentiometer is mechanically coupled to the substantially distal end of said shafting portion of said rotatably free kingpin within said suitable housing.

8. A device according to claim 1 in which the body portion of said potentiometer is affixed securely within said suitable housing.

* * * * *